United States Patent [19]

Horikiri et al.

[11] 3,937,775

[45] Feb. 10, 1976

[54] PROCESS FOR PRODUCTION OF CARBON PRODUCTS

[75] Inventors: Shozo Horikiri, Amagasaki; Jiro Iseki, Toyonaka; Masao Minobe, Ibaraki; Chikanao Kawai, Amagasaki, all of Japan

[73] Assignee: Sumitomo Chemical Company, Limited, Japan

[22] Filed: Oct. 18, 1973

[21] Appl. No.: 407,509

[30] Foreign Application Priority Data
Oct. 23, 1972 Japan.................. 47-106445

[52] U.S. Cl.................... 264/29; 423/449
[51] Int. Cl.²......................... B29C 25/00
[58] Field of Search.............. 264/29; 423/449

[56] References Cited
UNITED STATES PATENTS

| | | | |
|---|---|---|---|
| 2,797,201 | 6/1957 | Veatch et al. | 264/123 |
| 3,264,073 | 8/1966 | Schmitt | 264/29 |
| 3,403,008 | 9/1968 | Hamling | 264/29 |
| 3,639,953 | 2/1972 | Kimura et al. | 264/29 |
| 3,666,417 | 5/1972 | Araki et al. | 423/447 |
| 3,723,610 | 3/1973 | Fischer et al. | 264/29 |

Primary Examiner—Lorenzo B. Hayes
Attorney, Agent, or Firm—Stewart and Kolasch, Ltd.

[57] ABSTRACT

A process for the production of carbon micro-balloons and carbon micro-spheres which comprises reacting polymeric microparticles with sulfuric anhydride or chlorosulfonic acid so as to make the surface layer or the whole of the micro-particles infusible and then carbonizing the obtained micro-particles by heating them at a temperature above the decomposition point of the starting polymer.

18 Claims, No Drawings

PROCESS FOR PRODUCTION OF CARBON PRODUCTS

The present invention relates to a novel process for producing a carbon micro-balloon and a carbon microshpere, which are novel products and are widely useful in industry because of the superior properties of carbon, such as superior heat resistance, electric conductivity, friction property, chemical resistance, and the like.

There has, hitherto, been known that a carbon micro-balloon can be produced by carbonizing an organic micro-balloon made from an organic material such as a phenalic resin, or by dispersing an appropriate foaming agent into a specific pitch, making a micro-balloon particle therefrom, heating it to make a micro-balloon and then carbonizing it at higher temperatures. However, the former method has disadvantages that it is necessary to use an organic micro-balloon made from an organic material such as a phenalic resin and further it requires many steps. Besides, in the latter method it is necessary to prepare a specific pitch and therefore the method is not suitable for the industrial manufacture of the carbon product.

Under the circumstances, studies have been conducted to find a novel process for producing carbon products such as carbon micro-balloons and carbon micro-spheres without the disadvantages above-mentioned, and it has now been found that there can be easily produced the desired carbon micro-balloon and carbon micro-sphere by reacting a micro-particle made from one or more kinds of polymers with sulfuric anhydride or chlorosulfonic acid and then carbonizing the resulting modified micro-particle by heating.

According to the present invention, a micro-particle made from a polymer is reacted with sulfuric anhydride or chlorosulfonic acid so as to make the surface layer or the whole of the micro-particle infusible and the modified micro-particle is carbonized by heating to give the desired carbon micro-balloon or carbon microsphere, respectively. In the present method, it is not necessary to prepare previously a micro-balloon from the starting material and further any conventional polymer can be used as the starting material.

There have been known some methods for making a polymer infusible and improving the yield in the carbonization step, such as oxidization with oxygen, ozone or the like, halogenation with chlorine, bromine or the like, and carbonization in an atmosphere of phosphorous pentachloride or hydrogen chloride. The present inventors have studied various methods for carbonizing organic materials and have found that a cheaper material such as polyethylene and polystyrene can be used as the starting material and it can be easily carbonized by heating at around 1000°C in a high carbonization yield such as 90 percent or more. In the present specification, the carbonization yield means the ratio by weight of carbonization residue to the carbon in the starting material.

When the starting material as mentioned above is heated in an atmosphere of inactive gas, such as nitrogen, helium or argon, or in a vacuum up to a temperature of 1000°C, a carbon product can be hardly obtained. According to the present invention, however, when the starting material is previously reacted with sulfuric anhydride or chlorosulfonic acid, it can be substantially carbonized by heating at around 500°C in an atmosphere of inactive gas, such as nitrogen, helium or argon, or in a vacuum.

Thus, the present invention provides a novel process for producing a carbon micro-balloon and a carbon micro-sphere by reacting a micro-particle made from one or more kinds of polymers with sulfuric anhydride or chlorosulfonic acid until the surface layer or the whole of the micro-particle is made infusible and then carbonizing the modified micro-particle by heating.

In the present invention, various kinds of polymers can be used as the starting material. One example of the polymer is a polymer obtained from a monomer having a vinyl group in the molecule, which has the following general formula:

wherein $R_1$ is hydrogen, hydrocarbon, substituted hydrocarbon, hydrocarbonoxy, substituted hydrocarbonoxy, halogen, cyano, hydroxy, $-OCOR_2$ or $-COOR_2$; $R_2$ is hydrogen, hydrocarbon or substituted hydrocarbon; and n is an integer which shows the degree of polymerization. Suitable examples of the polymer are an alkyl vinyl polymer (e.g. polyethylene, or polypropylene), and aryl vinyl polymer (e.g. polystyrene, or polyvinylnaphthalene), a vinyl ether polymer (e.g. polyethyl vinyl ether, or polyisobutyl vinyl ether), a halogenovinyl polymer (e.g. polyvinyl chloride), a polyvinyl ester (e.g. polyvinyl acetate), a polyacrylic ester (e.g. polymethyl acrylate), a polyvinyl nitrile (e.g. polyacrylonitrile) and the like.

Another example of the polymer is a polymer obtained from a monomer having a vinylidene group in the molecule, which has the following general formula:

wherein $R_1$ and $R_2$ are each hydrocarbon, substituted hydrocarbon, hydrocarbonoxy, substituted hydrocarbonoxy, halogen, cyano, $-OCOR_3$ or $-COOR_3$; $R_3$ is hydrogen, hydrocarbon or substituted hydrocarbon; and n is an integer which shows the degree of polymerization. Suitable examples of the polymer are an alkyl or aryl vinylidene polymer (e.g. polyisobutylene, or poly($\alpha$-methylstyrene)), a halogenovinylidene polymer (e.g. polyvinylidene chloride), a poly($\alpha$-alkyl acrylate) (e.g. polymethyl methacrylate, or polyethyl methacrylate), a cyanovinylidene polymer (e.g. polycyanovinylidene), and the like.

A further example of the polymer is a polymer obtained from a monomer having a conjugated double bond in the molecule, which has the following general formula:

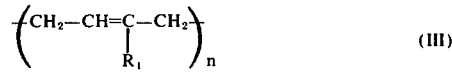

wherein $R_1$ is hydrogen, hydrocarbon, substituted hydrocarbon, halogen, cyano, $-OCOR_4$ or $-COOR_4$; $R_4$ is hydrogen, hydrocarbon or substituted hydrocarbon;

and n is an integer which shows the degree of polymerization. Suitable examples are polybutadiene, polyisoprene, polychloroprene (neoprene), and the like.

A still further example of the polymer is a copolymer of two or more kinds of monomers of the above polymers (I), (II) and (III), or a graft copolymer thereof. Suitable examples of the copolymer are ethylene-propylene copolymer, ethylenepropylene-dicyclopentadiene terpolymer, ethylene-propylene-ethylidenenorbornene terpolymer, styrene-acrylonitrile copolymer, styrene-acrylonitrile-butadiene terpolymer, ethylene-vinyl acetate copolymer, styrene-butadiene copolymer (SBR and high impact polystyrene are also included therein), butadieneacrylonitrile copolymer, ethylene-isobutylene-butadiene terpolymer, ethyl acrylate-$\beta$-chloroethyl vinyl ether copolymer, butyl acrylate-acrylonitrile copolymer, vinyl chloride-ethylene copolymer, vinyl chloride-propylene copolymer, normal butene-isobutene copolymer, isobutylene-isoprene copolymer, acrylonitrile-methyl acrylate copolymer, acrylonitrile-vinyl acetate copolymer, acrylonitrile-methyl methacrylate copolymer, acrylonitrile-acrylic acid copolymer, acrylonitrile-methacrylic acid copolymer, acrylonitrile-vinyl chloride copolymer, acrylonitrile-vinylidene chloride copolymer, vinyl chloride-vinylidene chloride copolymer, and the like.

There may be further used other polymers, such as polyesters (e.g. polyethylene terephthalate, polyethylene isophthalate, polyethylene fumarate, polypropylene maleate, or polyparaethyleneoxy benzoate); polyamides (e.g. polycapramide (i.e. nylon-6), or polyhexamethylenedipolyamide (i.e. nylon-66); polyurethanes (e.g. polyethylene methylenebis(4-phenyl)carbamate, or polytetramethylene hexamethylenedicarbamate); polyalkylene ethers or poly(substituted alkylene ethers) (e.g. polyoxymethylene, polyethylene oxide, or poly(bischloromethyloxyethane)); polyphenylene oxides (e.g. poly-(2,6-dimethyl-1,4-phenylene oxide), or poly(2,6-diphenyl-1,4-phenylene oxide)); polymers containing formaldehyde as a monomer unit (e.g. xylene-formaldehyde polymer, methyl ethyl ketone-formaldehyde polymer, acetophenone-formaldehyde polymer, cyclohexanone-formaldehyde polymer, styrene-formaldehyde polymer, toluene-formaldehyde polymer, phenol-formaldehyde polymer, melamine-formaldehyde polymer, or urea-formaldehyde polymer); polymers containing bisphenol A as a monomer unit (e.g. bisphenol A-epichlorohydrin polymer, bisphenol A-phosgene polymer, or bisphenol A-4,4'-diphenylsulfone polymer); and unsaturated polyesters obtained from a monomer such as diallyl phthalate. There may be also used pitches obtained by purification of petroleum or by carbonization of coal.

Among those polymers, the preferred one is a polymer having at least 60 percent of theoretical carbon content. Particularly, polystyrene and polyethylene are the most suitable starting material for the industrial production of carbon products in view of the low cost thereof and the ease of making micro-particles therefrom. These polymers may be used in the present invention alone or in a form of a mixture of two or more kinds thereof.

The starting polymer is at first formed into a micro-particle which is substantially spherical. The micro-particle may be preferably prepared directly during the course of the polymerization process by suspension polymerization, emulsion polymerization or the like, but any other conventional methods may be used. The size of the micro-particle is preferably in a range of 1 $\mu$ to 1 cm, more preferably 10 $\mu$ to 1000 $\mu$ in diameter in view of the utility of the final product carbon micro-balloon and carbon micro-sphere.

The micro-particle is reacted with sulfuric anhydride of chlorosulfonic acid at a temperature of below the melting or softening point of the micro-particle and above $-30°C$, preferably above 0°C, and thereby the surface layer of the micro-particle is made infusible to give a modified micro-particle.

The sulfuric anhydride may be used as it is, or in a mixture thereof with an optional amount of substantially anhydrous air or inactive gas (e.g. nitrogen, helium, or argon), or sulfuric acid, a halogenated solvent (e.g. methylene chloride, dichloroethane, or chloroform), dimethylformamide, dimethylsulfoxide, liquidized sulfur dioxide, or the like. The chlorosulfonic acid may be used as it is, or in a mixture thereof with an optional amount of a halogenated solvent (e.g. methylene chloride, dichloroethane, or trifluoroacetic acid), acetic acid, acetic anhydride, sulfuric acid, or the like.

The temperature in the modification step abovementioned may be maintained at a fixed one within the range defined above through the whole reaction, but may be gradually risen. When the temperature is risen, the upper limit may be preferably at around 400°C, since it causes undesirable side reactions to heat over the upper limit.

According to the modification treatment with sulfuric anhydride or chlorosulfonic acid, the starting micro-particle is modified from the surface. Accordingly, by selecting an appropriate reaction temperature and reaction time, the inner part of the micro-particle may be maintained without being modified, i.e. the inner part may be not reacted. The surface layer thus modified may be changed to an insoluble and infusible material by heating in a range of 100°C to 400°C, preferably 250°C to 400°C.

The modified micro-particle is carbonized by heating at a temperature of above the main decomposition point of the starting material, at least above 500°C in an atmosphere of an inactive gas (e.g. nitrogen, helium, or argon) or in a vacuum, and thereby the inner part (not modified) of the micro-particle is decomposed by heat and most of them are released out in a form of a gas to give the desired carbon micro-balloon, the inner part of which is hollow. When a carbon micro-balloon is produced, the upper limit of the heating temperature is suitably around 1500°C. By the way, when a graphitized micro-balloon is produced, the upper limit of the heating temperature is around 2000°C to 3000°C.

The heating rate in the carbonization step may be lower than 100°C/minute, preferably lower than 50°C/minute. Insofar as the heating rate is within this limit, no noticeable difference is seen in the yield and the mechanical properties of the carbonized product by the variation of the heating rate.

Thus, by changing the temperature and time in the modification step, the thickness of the modified surface layer of the micro-particle can be appropriately controlled and then the thickness of the shell of the carbon micro-balloon can be also controlled. Furthermore, when the micro-particle is reacted with sulfuric anhydride or chlorosulfonic acid sufficiently and thereby the whole of the micro-particle is modified (made infusible), the desired carbon micro-sphere, the inner part of which is not hollow, can be produced by carbonizing the modified micro-particle by heating in the same manner as described above.

As understood from the above explanations, the conditions for the modification treatment of the micro-particle made from polymers depend on the kind of the polymers, the size of the micro-particles, the thickness of the shell of the carbon micro-balloon to be obtained, the kind and concentration of the reagent to be used in the modification treatment, the reaction temperature and time during the modification treatment and so on. In order to obtain the carbon micro-balloon having a larger thickness, a higher reaction temperature, a longer reaction time and/or a higher concentration of the reagent may be used. The adoption of a higher reaction temperature and/or a higher concentration of the reagent may be effective in shortening the time for the modification treatment.

The carbon micro-balloon and carbon micro-sphere and their graphitized products obtained by the present invention have superior heat resistance, chemical resistance, electroconductivity and lubricity and are useful in various fields. For instance, their mixtures with thermosetting resins (e.g. epoxy resin, phenolic resin) or thermoplastic resins (e.g. Teflon, Nylon, polyacetal) are useful for the manufacture of mechanical parts of low friction and high abrasion resistance and also for the manufacture of electro-conductive and electro-thermal articles. Further, for instance, the products obtained by molding the said materials by the aid of a binder such as pitch or a phenolic resin and carbonizing the binder on heating to form carbon foam materials may be used as electrodes in fuel cells and air-zinc cells, thermal-insulating materials, filters for acids and alkalis and the like. The activation of the carbon foam materials can afford air filters having a small air resistance. Moreover, the carbon micro-balloon and its graphitized product are per se useful as thermal-insulating materials, sensitive carbons for telephones and the like.

The present invention is illustrated by the following examples but is not limited thereto.

EXAMPLE 1

Polystyrene micro-particles having 100 – 190 $\mu$ in diameter (5 g) were dispersed into fuming sulfuric acid (200 g) containing 30 percent by weight of sulfuric anhydride and then the mixture was reacted with agitation at 30°C for 5 hours. After the reaction, polystyrene micro-particles were separated by filtration and washed with sulfuric acid and further washed sufficiently with water and dried in a vacuum at room temperature for 5 hours. The modified polystyrene micro-particles thus obtained were 12.1 g. The modified polystyrene micro-particles were carbonized by heating in nitrogen gas and raising the temperature at a rate of 300°C/hour from room temperature up to 1000°C to give carbon micro-spheres having no hollow portion in a yield of 91.8 percent calculated on the starting polystyrene micro-particle.

EXAMPLE 2

In the same manner as described in Example 1, the modification reaction was carried out, excepting that the reaction time with fuming sulfuric acid was one hour. The modified polystyrene micro-particles obtained after drying in a vacuum were 9.3 g. The modified polystyrene micro-particles were carbonized by heating in nitrogen gas while raising the temperature at a rate of 300°C/hour from room temperature up to 1000°C to give carbon micro-balloons in a yield of 66.8 percent. The thickness of the shell of the micro-balloons was about 30 $\mu$ in average.

EXAMPLE 3

In the same manner as described in Example 1, the modification reaction was carried out, excepting that the concentration of sulfuric anhydride in fuming sulfuric acid was 60 percent by weight. The modified polystyrene micro-particles obtained after drying in vacuum were 14.8 g. The modified polystyrene micro-particles were carbonized by heating in nitrogen gas while raising the temperature at a rate of 300°C/hour from room temperature up to 1000°C to give carbon microspheres having no hollow portion in a yield of 98.8 percent.

EXAMPLE 4

Polystyrene micro-particles produced by suspension polymerization were passed through a screen and the polystyrene micro-particles having 149 – 210 $\mu$ in diameter were contacted with sulfuric anhydride in nitrogen carrier gas with agitation at 80°C for 2 hours and then carbonized by heating at nitrogen gas while raising the temperature in a rate of 300°C/hour up to 1000°C. The yield of the carbon micro-balloon thus obtained was 42.6 percent calculated on the starting polystyrene micro-particle. The thickness of the shell of the micro-balloon was about 30 $\mu$ in average.

EXAMPLE 5

Polystyrene micro-particles having 210 – 297 $\mu$ in diameter were contacted with sulfuric anhydride in nitrogen carrier gas with agitation while raising the temperature at a rate of 10°C/hour from 80°C up to 120°C and then carbonized by heating and raising the temperature at a rate of 300°C/hour up to 1000°C to give carbon micro-sphere having no hollow portion in a yield of 87.1 percent.

EXAMPLE 6

Polystyrene micro-particles as in Example 4 were contacted with chlorosulfonic acid at 55°C for 6 hours and then the chlorosulfonic acid was removed. The modified polystyrene micro-particles thus obtained were washed with acetic acid and dried, and then carbonized in nitrogen gas by raising the temperature at a rate of 300°C/hour up to 1000°C to give carbon micro-balloons. The yield of the carbon micro-balloon was 31.3 percent.

EXAMPLE 7

Polystyrene micro-particles as in Example 4 were dipped into chlorosulfonic acid at room temperature and heated with agitation while raising the temperature at a rate of 60°C/hour up to 145°C and then it was allowed to stand at the same temperature for one hour. After removing chlorosulfonic acid, the modified polystyrene micro-particles were washed with acetic acid and dried, and then carbonized in nitrogen gas by raising the temperature at a rate of 300°C/hour up to 1000°C to give carbon micro-spheres. The yield was 88.7 percent.

EXAMPLE 8

High density polyethylene micro-particles having an average diameter of 150 $\mu$ were dipped into chlorosulfonic acid and further treated in the same manner as described in Example 7. The product thus obtained was carbonized in nitrogen gas by raising the temperature at a rate of 300°C/hour up to 1000°C to give carbon micro-spheres. The yield was 85.3 percent.

EXAMPLE 9

Trans-polybutadiene micro-particles (trans component: 88.5 percent) having an average diameter of 100 μ were contacted with sulfuric anhydride in nitrogen carrier gas with agitation at 100°C for 2 hours and then carbonized by heating in nitrogen gas by raising the temperature at a rate of 300°C/hour up to 1000°C. The yield of the carbon micro-balloon thus obtained was 54.2 percent.

EXAMPLE 10

Acrylonitrile-butadiene copolymer micro-particles (acrylonitrile component: 48 percent) having an average diameter of 300 μ were contacted with sulfuric anhydride in nitrogen carrier gas with agitation at 50°C for 2 hours and then carbonized by heating in nitrogen gas and raising the temperature at a rate of 300°C/hour up to 1000°C. The yield of the carbon micro-balloon thus obtained was 32.9 percent.

EXAMPLE 11

S-B-S type styrene-butadiene copolymer micro-particles (styrene component: 56 percent) having an average diameter of 300 μ were treated in the same manner as described in Example 10 to give carbon micro-balloons. The yield was 31.4 percent.

EXAMPLE 12

Each of the micro-particles of trans-polybutadiene, acrylonitrile-butadiene copolymer and styrene-butadiene copolymer, which were prepared in Examples 9, 10 and 11, respectively, were dipped into chlorosulfonic acid at room temperature and then heated with agitation while raising the temperature at a rate of 60°C/hour up to 110°C and allowed to stand at the same temperature for one hour. After removing chlorosulfonic acid, the modified micro-particles were washed with acetic acid to give modified black micro-particles. The modified micro-particles were carbonized by heating in nitrogen gas up to 1000°C to give carbon micro-balloons.

What is claimed is:

1. A process for producing carbon micro-balloons which comprises reacting micro-particles made from at least one polymer selected from the group consisting of an alkyl vinyl polymer, an aryl vinyl polymer, a vinyl ether polymer, a polyacrylic ester, a polyvinyl nitrile, an alkyl vinylidene polymer, an aryl vinylidene polymer, a cyanovinylidene polymer, polybutadiene, polyisoprene and polychloroprene with sufficient sulfuric anhydride or chlorosulfonic acid at a temperature of 0°C. to 400°C. so as to render the surface layer of said micro-particles infusible while the inner part of the micro-particles is maintained without being so modified, and carbonizing the resulting modified micro-particles by heating at a temperature above the decomposition point of the starting polymer, said temperature being at least in the range of 500°C. to 1,500°C.

2. A process for producing carbon micro-spheres which comprises reacting micro-particles made from one or more polymers as set forth in claim 1 with sufficient sulfuric anhydride or chlorosulfonic acid at a temperature of 0°C. to 400°C. until the whole of the micro-particles is rendered infusible, and carbonizing the resulting infusible micro-particles by heating at a temperature above the decomposition point of the starting polymer, said temperature being at least in the range of 500°C. to 1,500°C.

3. A process for producing graphitized micro-balloons according to claim 1, wherein the heating of the modified micro-particles is carried out at a temperature of from 1,500°C to 3,000°C.

4. A process for producing graphitized micro-spheres according to claim 2, wherein the heating of the infusible micro-particles is carried out at a temperature of from 1,500°C. to 3,000°C.

5. The process according to claim 1, wherein the sulfuric anhydride is used in a mixture with sulfuric acid.

6. The process according to claim 2, wherein the sulfuric anhydride is used in a mixture with sulfuric acid.

7. The process according to claim 1, wherein the sulfuric anhydride is used in a mixture with at least one gas selected from the group consisting of substantially anhydrous air, nitrogen, helium and argon.

8. The process according to claim 2, wherein the sulfuric anhydride is used in a mixture with at least one gas selected from the group consisting of substantially anhydrous air, nitrogen, helium and argon.

9. The process according to claim 1, wherein the polymer is an alkyl vinyl polymer or an aryl vinyl polymer.

10. The process according to claim 2, wherein the polymer is an alkyl vinyl polymer or an aryl vinyl polymer.

11. The process according to claim 9, wherein said polymer has a carbon content of at least 60 percent.

12. The process according to claim 10, wherein said polymer has a carbon content of at least 60 percent.

13. The process according to claim 9, wherein said alkyl vinyl polymer is polyethylene and said aryl vinyl polymer is polystyrene.

14. The process according to claim 10, wherein said alkyl vinyl polymer is polyethylene and said aryl vinyl polymer is polystyrene.

15. A carbon micro-balloon produced by the process according to claim 1.

16. A carbon micro-sphere produced by the process according to claim 2.

17. A graphitized micro-balloon produced by the process according to claim 3.

18. A graphitized micro-sphere produced by the process according to claim 4.

* * * * *